United States Patent [19]

Brooks

[11] Patent Number: 4,825,628
[45] Date of Patent: May 2, 1989

[54] HEADER PLATFORM

[76] Inventor: Donald G. Brooks, 92 Northstead St., Scarborough, Western Australia, Australia

[21] Appl. No.: 142,156

[22] Filed: Jan. 11, 1988

[51] Int. Cl.[4] .......................................... A01D 57/08
[52] U.S. Cl. ...................................... 56/219; 56/14.5
[58] Field of Search ................ 56/14.5, 14.6, 219-227

[56] References Cited

U.S. PATENT DOCUMENTS

| | | | |
|---|---|---|---|
| 731,897 | 6/1903 | Hauenstein | 56/219 |
| 859,602 | 7/1907 | Green | 56/296 |
| 1,178,419 | 4/1916 | Shorten | 56/219 |
| 1,674,158 | 6/1928 | Lollier | 56/219 |
| 1,794,658 | 3/1931 | Walsh | 56/219 |
| 1,868,437 | 7/1932 | Taylor | 56/219 |
| 1,883,770 | 10/1932 | Dowling | 56/219 |
| 1,900,269 | 3/1933 | Altgelt et al. | 56/219 |
| 2,502,810 | 4/1950 | Waters | 56/DIG. 8 |
| 2,670,586 | 3/1954 | Phillips | 56/158 |
| 2,710,516 | 6/1955 | Kaesemeyer et al. | 56/158 |
| 2,718,744 | 9/1955 | Phillips | 56/158 |
| 2,734,331 | 2/1956 | Phillips | 56/296 |
| 2,737,006 | 3/1956 | Klingler | 56/158 |
| 3,165,874 | 1/1965 | Osteen | 56/23 |
| 3,193,995 | 7/1965 | Miller | 56/21 |
| 3,581,483 | 6/1971 | Kohl | 56/327 |
| 3,638,408 | 2/1972 | Swanson | 56/219 |
| 4,177,626 | 12/1979 | McNaught | 56/14.5 |
| 4,282,703 | 8/1981 | Wilson et al. | 56/14.6 |
| 4,406,112 | 9/1983 | Brooks | 56/12.9 |

FOREIGN PATENT DOCUMENTS

| | | | |
|---|---|---|---|
| 20772 | 11/1915 | Denmark | 56/219 |
| DE 3231771 | 3/1984 | Fed. Rep. of Germany . | |
| 624215 | 8/1961 | Italy . | |

Primary Examiner—John Weiss
Attorney, Agent, or Firm—Kinney & Lange

[57] ABSTRACT

The header platform of a harvester has located above it a sweeper assembly which comprises a finger frame and sweeper fingers dependig from the finger frame but terminating at their lower ends at a higher elevation than the knife assembly, tracks guiding the rear end of the finger frame for fore and aft movement, and a crank shaft coupled to the front end of the finger frame and driven to cause the sweeper fingers to lower, move rearwardly over the platform, and raise, to thereby be effective in moving a crop rearwardly over the platform.

9 Claims, 4 Drawing Sheets

HEADER PLATFORM

This invention relates to improvements in a header platform such as is used for the reaping of cereal and other crops (including tea, and certain bean crops).

BACKGROUND OF THE INVENTION

At the present time header platforms are sometimes constructed to extend transversely of the direction of travel of a harvesting machine, and a header platform is provided with a pair of co-axial augers, one having a left-hand flight and ther other a right-hand flight, the augers being driven so that a crop after having been cut by the comb of the header platform and moved onto the platform is transported to a central location. At the central location, the crop is urged rearwardly by the action of the spiral augers and/or retractable fingers, and is then transported by an elevator, usually a slat elevator which, in the trade, is termed a "broad elevator", and this elevates the crop into the threshing drum of the machine. For the relevant prior art, the reader may refer to the U.S. Pat. Nos. 4,177,626 ST. McNAUGHT; 4,282,703 WILSON; and German Pat. No. 32 31771 DEERE.

One of the main difficulties which is encountered with existing header platforms is that the crop is moved onto the header platform in a substantially even flow, and transported across the platform at a substantially even speed and therefore tends to bunch in front of the broad elevator. In some instances the crop becomes so congested that its flow stops, so that the operator has to significantly slow the speed of the harvesting machine down to overcome this build-up problem.

BRIEF SUMMARY OF THE INVENTION

In this invention, the header platform of a harvester has located above it a sweeper assembly which comprises a sweeper arm and sweeper fingers depending from the sweeper arm but terminating at their lower ends at a higher elevation than the knife assembly, and a shaft driving the sweeper assembly to cause the sweeper fingers to lower, move rearwardly over the platform, and raise, to thereby be effective in moving a crop rearwardly over the platform.

More specifically, the improvements of this invention comprise a sweeper frame, securing means securing the frame to the harvester above the harvester, a sweeper assembly comprising sweeper fingers depending therefrom but terminating at their lower ends at a higher elevation than the knife assembly, and drive means coupled to the sweeper assembly, so constructed and arranged that actuation of the drive means causes the sweeper fingers to lower, move rearwardly over the platform, and raise to thereby be effective in moving a cut crop rearwardly over the platform.

With this invention, there is less likelihood of the crop choking the header platform at the locality of the broad elevator, and in those instances where the adjacent ends of the augers are apart from one another, and the broad elevator extends to the platform to an area between the adjacent ends of the augers, the sweeper assembly can be sufficiently narrow to operate between the augers.

However, in other instances wherein heavy crops are to be handled, the sweeper assembly can cover a greater expanse of the header platform, right up to the total width.

BRIEF DESCRIPTION OF THE DRAWINGS

An embodiment of the invention is described hereunder in some detail with reference to, and is illustrated in, the accompanying drawings, in which.

Figure 1:
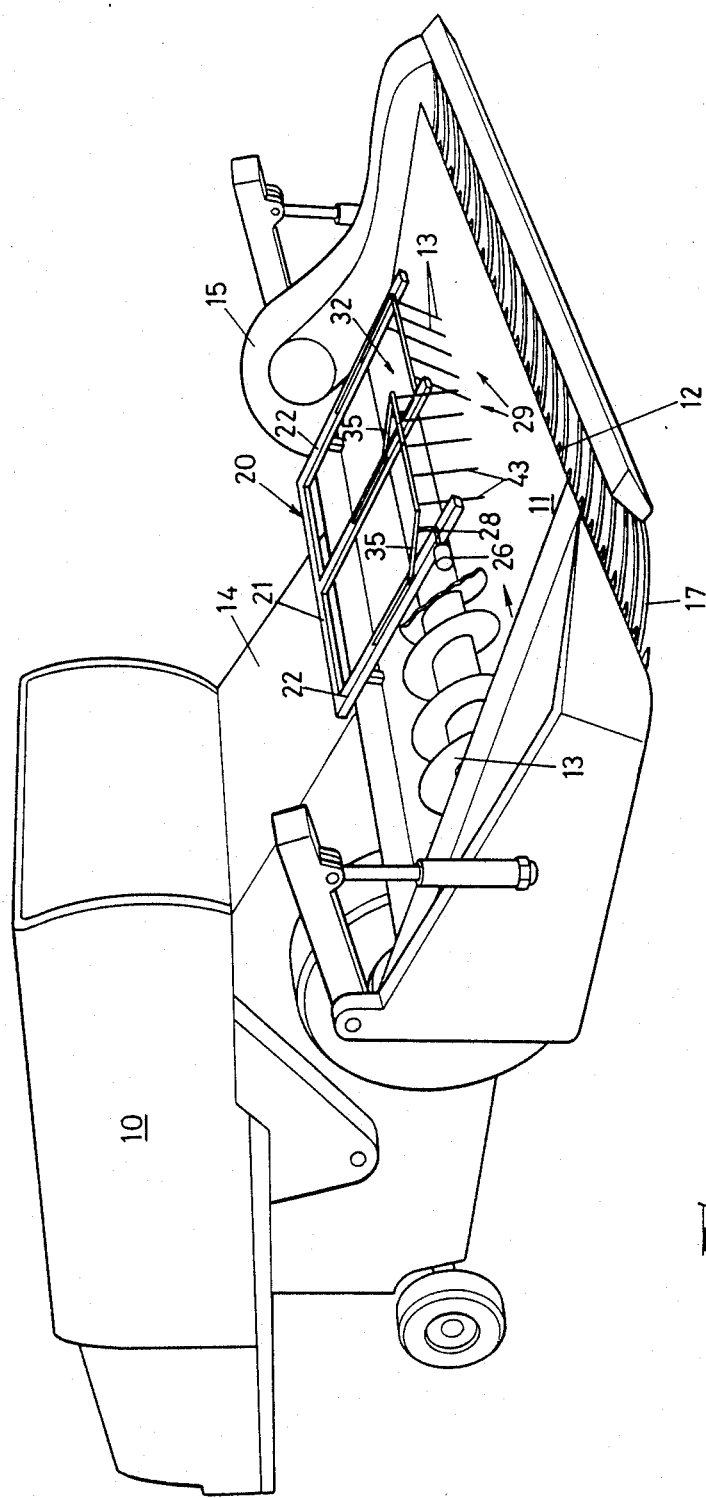
FIG. 1 is a diagrammatic representation of a harvester having the sweeper assembly over portion only of the header platform.

In this embodiment, a harvester 10 is of the type commonly used, in that it has a header platform 11, a knife assembly 12 across the front of the header platform 11, and a pair of coaxial augers 13 (of which only one is shown in FIG. 1), the flights of the augers 13 being spaced apart at the centre of the header platform so that a crop which is transported transversely across the rear of the header platform by augers 13 is caused by those augers to flow rearwardly and on to a slat type broad elevator (not shown) but contained in the elevator housing 14. In the illustrations shown, the machine is provided with an air blower 35 which is driven to blow air athrough a manifold 16 to be discharged through discharge conduits 17, substantially in accordance with the applicant's U.S. Pat. No. 4,406,112.

Figure 2:
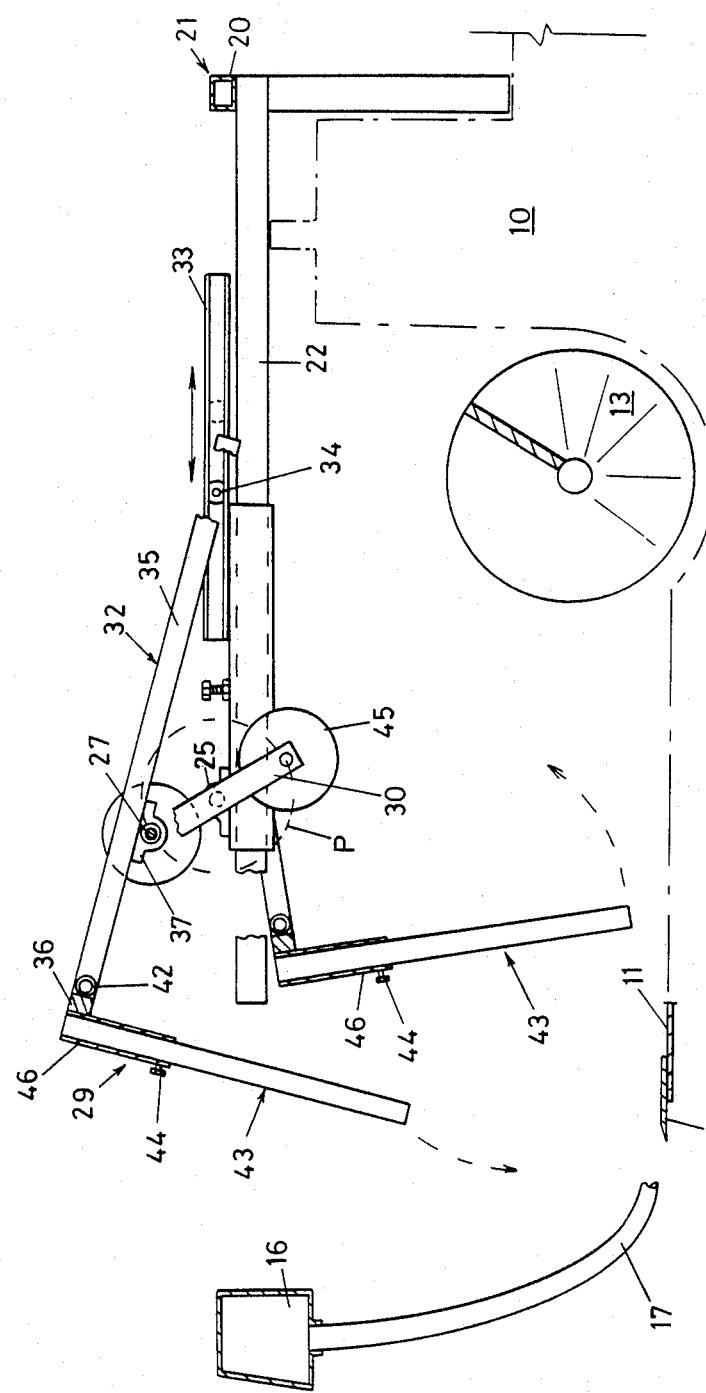
FIG. 2 is a cross-section of a sweeper frame assembly.
Figure 4:
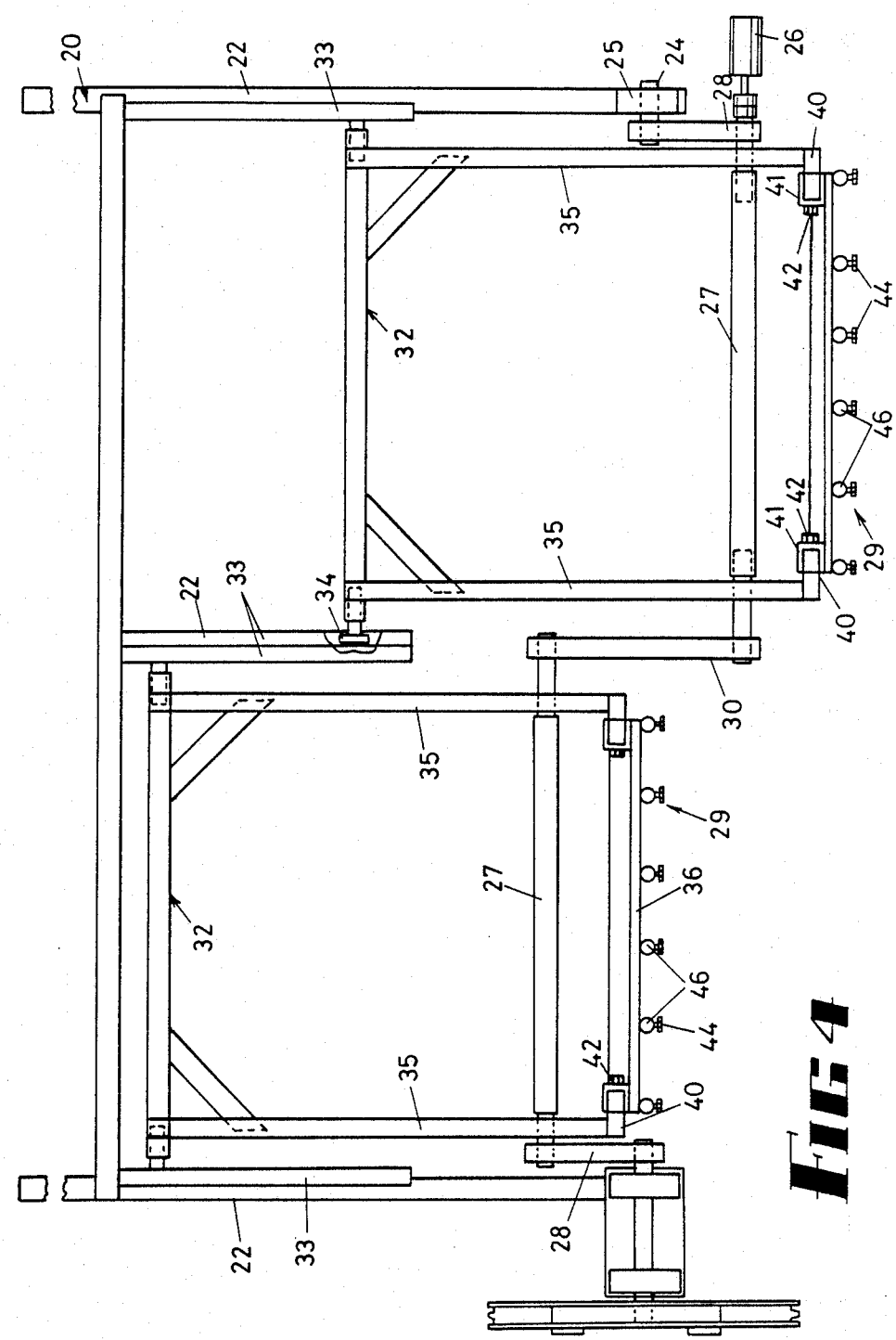
FIG. 4 is a plan view of a sweeper frame having two sweeper assemblies side by side.

As stated, the problem which is sometimes encountered is that the crop tends to bunch at the location of the broad elevator, that is at the centre of the rear portion of the header platform 11, and in this embodiment there is provided a sweeper frame 20 which has securing means for securing it to the harvester 10 as best seen in FIG. 2, such that the frame extends out forwardly to be cantilevered over the header platform, terminating in approximately the same vertical plane as the knife assembly 12. As shown, the sweeper frame 20 comprises a rear frame member 21 and forwardly projecting frame arms 22. A crank shaft 24 is journalled for rotation in bearings 25 on the two outer frame arms 22, and is driven by the hydraulic motor 26. This is shown only diagrammatically in FIG. 1. The crank shaft has two crank portions 27 connected to it by respective crank arms 28, and when use is made of two sweeper assemblies 29 side-by-side, as illustrated in FIGS. 1, 2 and 4, there are two such crank portions 27 and are connected centrally of the frame 20 by a connecting arm 30, such that the crank portions 27 are displaced 180° from one another with respect to their rotation. Only one sweeper frame with two crank portions 27 is illustrated herein, but for many applications, two such sweeper frames are used, in order to extend further across the header platform 11.

Figure 3:
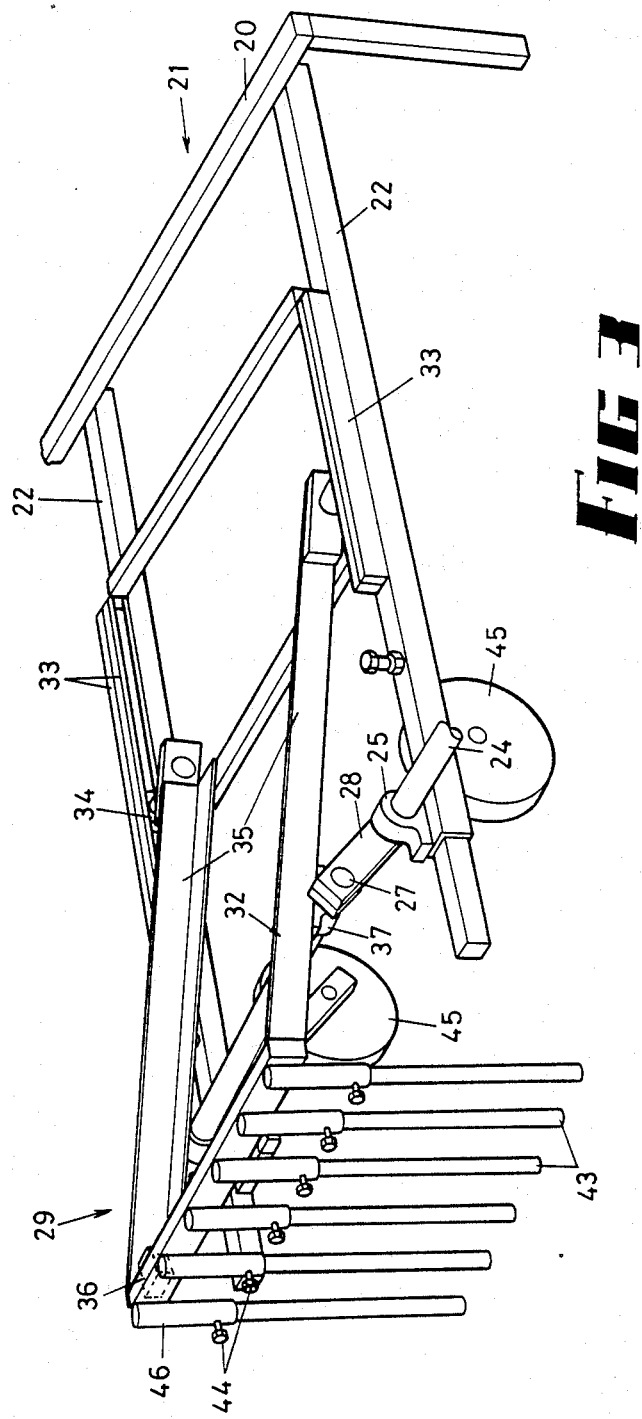
FIG. 3 is a perspective of a single sweeper assembly.

As seen best in FIGS. 2, 3 and 4, each forwardly projecting frame arm 22 carries on it at least one channel shaped guide track 33 (there being two such guide tracks back to back on the centre arm 22), and these guide tracks guide rollers 34 for movement in a fore and aft direction.

In the illustration, there are shown two sweeper assemblies 29 and each sweeper assembly 29 comprises a finger frame 32 having two spaced parallel side members 35 which slope forwardly and upwardly and are joined at their forward ends by a bridge 36, sweeper arms 35 carrying the rollers 34 on their rear ends to thereby be guided in a fore and aft direction by the guide tracks 33. The crank portions 27 of the crank shaft 24 are journalled in bearings 37 (FIG. 2) secured to the undersides of the sweeper arms 35, and upon operation of the hydraulic motor 26, the bearings 37 are caused to rotate in a circular path P as shown in FIG. 2.

As seeen best in FIG. 4, the front ends of the sweeper arms 35 terminate in respective spigots 40 and these are engaged by sleeves 41 on the ends of the bridge 36. The sleeves 41 are secured in position by bolts 42 so that the bridge 36 can be rotated to vary the inclination of a plurality of sweeper fingers 43 which depend from the bridge 36.

With this arrangement, the sweeper fingers move in a somewhat elliptical path, and at the front traverse of that path they lower, move rearwardly over the platform 11, and then raise to leave the crop which they have urged rearwardly, and the inclination varies as is best seen in FIG. 2 so that the rearwardly moving crop is penetrated by the fingers with a minimum of relative movement, and the fingers withdraw from the crop at the rear of their traverse, again with minimum relative movement, but the motion is effective in urging the crop rearwardly over the header platform, and, at the centre of the platform, between the flights 13 and on to the broad elevator of the harvester. The co-axial bolts 42 are effective in changing the inclination of the fingers 43, and the clamping screws 44 engage sleeves 46 and clamp the fingers 43 thereto, thereby enabling the effective lengths of the fingers 43 to be adjusted. These two adjustments are usually sufficient to enable a wide range of crop types and densities to be effectively controlled by this invention.

The drawings also illustrate counterweights 45 which can be used optionally. In some instances it is necessary to use only a single sweeper assembly 29 instead of the two sweeper assemblies as shown.

On the other hand, there are some instances where very heavy crops which are otherwise difficult to handle (for example lupins) can be better handled if the sweeper assemblies are much wider than shown and extend for most or all of the distance across the header platform 11.

Another improvement which can be incorporated in the invention is a variation of pitch of the flights of the augers so that the crop is moved more rapidly at the centre of the header platform than at its ends as the augers rotate. An hydraulic motor has been shown as directly coupled to the crank shaft 24 but this can be driven by means of "V" belts, a flat belt, a chain or a friction drive utilising a pneumatic tire on a wheel. This may be driven directly or indirectly off the platform auger or by any other suitable or desirable means.

In a further improvement of this invention, the header platform is provided with air movement means for assisting the movement of the crop towards and against the comb. In the past rotating beater bars have been used to push the crop into the comb. However, the use of air jets to "blow" the crop to the comb have resulted in improved harvest yields, and the use of such a system with the present invention would result in a very efficient harvester. An example of such an air movement means is shown in U.S. Pat. No. 4,406,112 (BROOKS).

I claim:

1. In a harvester having a header platform, a knife assembly extending across the front of the platform for severing a crop from its stalks, a pair of co-axial augers extending across the rear of the platform for transporting the crop in a direction transverse to the direction of harvester travel, and respective drive means coupled both to the knife and to the auger, improvements comprising a sweeper frame having a pair of spaced parallel frame arms, a respective channel shaped guide track on each frame arm, securing means securing the sweeper frame to the harvester with the frame arms extending forwardly towards, but above, the knife assembly, a crank shaft journalled for rotation in bearings on the front ends of the frame arms, a sweeper assembly comprising a finger frame, a plurality of sweeper fingers, means for securing the sweeper fingers to the front end of the finger frame to depend therefrom but terminate at a higher elevation than the knife assembly, rollers on the rear end of the finger frame engaging and guided for fore and aft movement by the channel shaped guide tracks, crank shaft bearings intermediate the ends of the finger frame engaging the crank portions of the crank shaft, and crank drive means coupled to the crank shaft, so constructed and arranged that actuation of the crank drive means causes the sweeper fingers to lower, move rearwardly over the platform, and rise to thereby be effective in moving a crop rearwardly over the platform.

2. Improvements in a harvester header platform according to claim 1 wherein said sweeper frame comprises a transversely extending rear frame member and said spaced parallel frame arms extend forwardly from the rear frame member and over said header platform.

3. Improvements in a harvester header platform according to claim 1 wherein said finer frame is U-shaped in plan, having a bridge and a pair of spaced parallel arms extending rearwardly from the bridge, said rollers being on the rear ends of respective said arms, and said fingers depending from said bridge and between the forward ends of said arms.

4. Improvements in a harvester header platform according to claim 3 wherein said sweeper finger securing means comprise a pair of co-axial bolts joining the finger frame arms to respective ends of the bridge, by which the bridge and fingers are adjustable for inclination.

5. Improvements in a harvester header platform according to claim 3 further comprising a plurality of sleeves on said bridge, and clamping screws clamping said fingers to respective said sleeves such that the effective lengths of said fingers can be adjusted.

6. Improvements in a harvester header platform according to claim 1 wherein there are two sweeper frames side by side, said crank shaft comprising two crank portions, and further comprising a connecting arm central of the sweeper frames joining the crank portions of the crank shaft so that the crank portions are displaced 180° from one another with respect to their rotation.

7. Improvements in a harvester header platform according to claim 1 further comprising at least one counterweight and a connecting arm coupling the counterweight to the crank shaft.

8. Improvements in a harvester header platform according to claim 1 wherein the sweeper assembly is located near the centre of the header platform.

9. Improvements in a harvester header platform according to claim 2 wherein the sweeper assembly extends across most of the width of the header platform.

* * * * *

UNITED STATES PATENT AND TRADEMARK OFFICE
CERTIFICATE OF CORRECTION

PATENT NO. : 4,825,628

DATED : May 2, 1989

INVENTOR(S) : Donald G. Brooks

It is certified that error appears in the above-identified patent and that said Letters Patent is hereby corrected as shown below:

Col. 4, line 33, delete "finer", insert --finger--.

Signed and Sealed this

Ninth Day of January, 1990

*Attest:*

JEFFREY M. SAMUELS

*Attesting Officer*   *Acting Commissioner of Patents and Trademarks*